US008028135B1

(12) United States Patent
Manley et al.

(10) Patent No.: US 8,028,135 B1
(45) Date of Patent: Sep. 27, 2011

(54) METHOD AND APPARATUS FOR MAINTAINING COMPLIANT STORAGE

(75) Inventors: Stephen Manley, Pleasanton, CA (US); William McGovern, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 563 days.

(21) Appl. No.: 10/933,005

(22) Filed: Sep. 1, 2004

(51) Int. Cl.
G06F 12/16 (2006.01)
G06F 12/00 (2006.01)
G06F 12/08 (2006.01)

(52) U.S. Cl. ........................... 711/161; 711/162

(58) Field of Classification Search ................ None
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,163,148 A | 11/1992 | Walls | |
| 5,235,695 A | 8/1993 | Pence | |
| 5,269,022 A | 12/1993 | Shinjo et al. | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,555,371 A | 9/1996 | Duyanovich et al. | |
| 5,638,509 A | 6/1997 | Dunphy et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,835,953 A | 11/1998 | Ohran | |
| 5,854,720 A | 12/1998 | Shrinkle et al. | |
| 5,857,208 A | 1/1999 | Ofek | |
| 5,864,346 A | 1/1999 | Yokoi et al. | |
| 5,872,669 A | 2/1999 | Morehouse et al. | |

(Continued)

FOREIGN PATENT DOCUMENTS

CA 2 256 934 A1 6/2000

(Continued)

OTHER PUBLICATIONS

Chris Lueth, "WORM Storage on Magnetic Disks Using SnapLock Compliance™ and SnapLock Enterprise™", Network Appliance, Inc., Sep. 2003, sections 1-5, 13 pages.

(Continued)

Primary Examiner — Midys Rojas
(74) Attorney, Agent, or Firm — Perkins Coie LLP

(57) ABSTRACT

According to an embodiment of the invention, a storage server is mirrored onto a mirroring server. The mirroring server maintains point-in-time images of data stored on the storage server. The point-in-time images have a retention period. During the retention period, the point-in-time images must be maintained to comply with 17 C.F.R. 240.17a-4 (the "Rule"). When a command to delete a point-in-time image is issued, the file system of the mirroring server references a table including a list of point-in-time images and their retention dates. If the current date is greater than the retention date, the point-in-time image is deleted. If the current date is less than the retention date, the point-in-time image cannot be deleted.

16 Claims, 7 Drawing Sheets

U.S. PATENT DOCUMENTS

| | | | |
|---|---|---|---|
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,021,491 A | 2/2000 | Renaud |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,134,660 A | 10/2000 | Boneh et al. |
| 6,163,856 A | 12/2000 | Dion et al. |
| 6,173,293 B1 | 1/2001 | Thekkath et al. |
| 6,173,359 B1 | 1/2001 | Carlson et al. |
| 6,195,730 B1 | 2/2001 | West |
| 6,225,709 B1 | 5/2001 | Nakajima et al. |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day, III et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara et al. |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur et al. |
| 6,654,912 B1 | 11/2003 | Viswanathan et al. |
| 6,658,435 B1 | 12/2003 | McCall et al. |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,796,489 B2 | 9/2004 | Slater et al. |
| 6,816,941 B1 | 11/2004 | Carlson et al. |
| 6,816,942 B2 | 11/2004 | Okada et al. |
| 6,834,324 B1 | 12/2004 | Wood |
| 6,839,843 B1 | 1/2005 | Bacha et al. |
| 6,850,964 B1 | 2/2005 | Brough et al. |
| 6,877,016 B1 | 4/2005 | Hart et al. |
| 6,898,600 B2 | 5/2005 | Fruchtman et al. |
| 6,915,397 B2 | 7/2005 | Lubbers et al. |
| 6,931,557 B2 | 8/2005 | Togawa et al. |
| 6,950,263 B2 | 9/2005 | Suzuki et al. |
| 6,973,369 B2 | 12/2005 | Trimmer et al. |
| 6,973,534 B2 | 12/2005 | Dawson et al. |
| 6,978,283 B1 | 12/2005 | Edwards et al. |
| 6,978,325 B2 | 12/2005 | Gibble et al. |
| 7,007,043 B2 | 2/2006 | Farmer et al. |
| 7,020,779 B1 | 3/2006 | Sutherland |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,127,577 B2 | 10/2006 | Koning et al. |
| 7,139,891 B1 | 11/2006 | Apvrille et al. |
| 7,152,077 B2 | 12/2006 | Veitch et al. |
| 7,152,078 B2 | 12/2006 | Yamagami |
| 7,155,465 B2 | 12/2006 | Lee et al. |
| 7,155,586 B1 | 12/2006 | Wagner et al. |
| 7,200,726 B1 | 4/2007 | Gole et al. |
| 7,203,726 B2 | 4/2007 | Hasegawa |
| 7,251,713 B1 | 7/2007 | Zhang |
| 7,302,057 B2 | 11/2007 | Rotholtz et al. |
| 7,346,623 B2 | 3/2008 | Prahlad et al. |
| 7,373,364 B1 | 5/2008 | Chapman |
| 7,558,839 B1 | 7/2009 | McGovern |
| 7,774,610 B2 | 8/2010 | McGovern et al. |
| 7,904,679 B2 | 3/2011 | Stager et al. |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0091670 A1 | 7/2002 | Hitz et al. |
| 2002/0095557 A1 | 7/2002 | Constable et al. |
| 2002/0144057 A1 | 10/2002 | Li et al. |
| 2002/0163760 A1 | 11/2002 | Lindsey et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0025800 A1 | 2/2003 | Hunter et al. |
| 2003/0037211 A1 | 2/2003 | Winokur |
| 2003/0046260 A1 | 3/2003 | Satyanarayanan et al. |
| 2003/0120476 A1 | 6/2003 | Yates et al. |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0103147 A1 | 5/2004 | Flesher et al. |
| 2004/0158766 A1 | 8/2004 | Liccione et al. |
| 2004/0167903 A1 | 8/2004 | Margolus et al. |
| 2004/0168034 A1 | 8/2004 | Homma et al. |
| 2004/0168057 A1 | 8/2004 | Margolus et al. |
| 2004/0181388 A1 | 9/2004 | Yip et al. |
| 2004/0181707 A1 | 9/2004 | Fujibayashi |
| 2004/0186858 A1 | 9/2004 | McGovern et al. |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0097260 A1* | 5/2005 | McGovern et al. ............ 711/100 |
| 2005/0108302 A1 | 5/2005 | Rand et al. |
| 2005/0144407 A1 | 6/2005 | Colgrove et al. |
| 2005/0182910 A1* | 8/2005 | Stager et al. .................. 711/162 |

| | | | |
|---|---|---|---|
| 2005/0240813 | A1 | 10/2005 | Okada et al. |
| 2006/0010177 | A1 | 1/2006 | Kodama |
| 2006/0047895 | A1 | 3/2006 | Rowan et al. |
| 2006/0047902 | A1 | 3/2006 | Passerini |
| 2006/0047903 | A1 | 3/2006 | Passerini |
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0259160 | A1 | 11/2006 | Hood et al. |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 A2 | 8/2003 |
| EP | 1671231 | 6/2006 |
| WO | WO-9906912 | 2/1999 |
| WO | WO-9903098 | 11/1999 |
| WO | WO 01/18633 A1 | 3/2001 |
| WO | WO-0118633 A1 | 3/2001 |
| WO | WO 03/067438 A2 | 8/2003 |
| WO | WO-03067438 A2 | 8/2003 |
| WO | WO 2004/084010 A2 | 9/2004 |
| WO | WO-2004084010 A2 | 9/2004 |
| WO | WO 2005031576 A2 | 4/2005 |
| WO | WO-2006023990 A2 | 3/2006 |
| WO | WO-2006023991 A2 | 3/2006 |
| WO | WO-2006023992 A2 | 3/2006 |
| WO | WO-2006023993 A2 | 3/2006 |
| WO | WO-2006023994 A1 | 3/2006 |
| WO | WO-2006023995 A2 | 3/2006 |

OTHER PUBLICATIONS

"Network Appliance WORM Storage Solution: SEC 17 a-4(f) Compliance Assessment", Network Appliance, Inc., Jul. 10, 2003, pp. i-20.
Simon L. Garfinkel et al., "Remembrance of Data Passed: A Study of Disk Sanitization Practices", IEEE Security and Privacy, vol. 1, No. 1, 2003, 19 pages.
Decru, "Decru Datafort E-Series Storage Security Appliances, Transparent Data Security for Network Attached Storage (NAS)", 2004. 2 pages.
Joan Daemen et al., "Note on Naming", Rijndael, Sep. 4, 2003, 2 pages.
Joan Daemen et al., "AES Proposal: Rijndael", The Rijndael Block Cipher, Document Version 2, Mar. 9, 1999, 45 pages.
Co-pending U.S. Appl. No. 11/227,329, filed Sep. 14, 2005.
Co-pending U.S. Appl. No. 11/227,812, filed Sep. 14, 2005.
Co-pending U.S. Appl. No. 10/932,683, filed Sep. 1, 2004.
Co-pending U.S. Appl. No. 11/051,862, filed Feb. 4, 2005.
Co-pending U.S. Appl. No. 12/040,276, filed Feb. 29, 2008.
Co-pending U.S. Appl. No. 11/051,794, filed Feb. 4, 2005.
Notice of Allowance Mailed Mar. 2, 2010 in Co-pending U.S. Appl. No. 11/227,329, filed Sep. 14, 2005.
Notice of Allowance Mailed Apr. 19, 2010 in Co-pending U.S. Appl. No. 11/227,329, filed Sep. 14, 2005.
Non-Final Office Action Mailed Apr. 29, 2010 in Co-Pending U.S. Appl. No. 11/051,794, filed Feb. 4, 2005.
Notice of Allowance Mailed May 6, 2009 in Co-pending U.S. Appl. No. 11/227,812, filed Sep. 14, 2005.
Final Office Action Mailed Aug. 17, 2007 in Co-pending U.S. Appl. No. 10/932,683, filed Sep. 1, 2004.
Non-Final Office Action Mailed Sep. 1, 2009 in Co-pending U.S. Appl. No. 11/227,329, filed Sep. 14, 2005.
Non-Final Office Action Mailed Jan. 22, 2007 in Co-pending U.S. Appl. No. 10/932,683, filed Sep. 1, 2004.
Non-Final Office Action Mailed Nov. 7, 2008 in Co-pending U.S. Appl. No. 11/227,812, filed Sep. 14, 2005.
"Scalability: Securitus v. Tape", Alacritus Website, Oct. 2003.
"Seamless Integration", Alacritus Website, Oct. 2003.
"Securitus", Alactritus Website, Oct. 2003.
"Securitus I White Paper: Disk Based Data Protection from Alacritus Software" Alacritus Software, Inc. Jul. 2001.
"Securitus White Paper: Disk Based Data Protection from Alacritus Software", Alacritus Website, Oct. 2003.
"Strengths: Securitus v. Tape", Alacritus Website, Oct. 2003.
"Testimonials", Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"Topologies", Alacritus Website, Oct. 7, 2003.
Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.
"Virtual Tape Library Technology Brochure", Alacritus Software Inc., Jul. 2001.
Advisory Action Mailed Jan. 15, 2010 in Co-pending U.S. Appl. No. 11/051,862, filed Feb. 4, 2005.
Advisory Action Mailed Mar. 13, 2009 in Co-pending U.S. Appl. No. 11/051,794, filed Feb. 4, 2005.
Final Office Action Mailed Oct. 29, 2009 in Co-pending U.S. Appl. No. 11/051,862, filed Feb. 4, 2005.
Final Office Action Mailed Dec. 11, 2008 in Co-pending U.S. Appl. No. 11/051,862, filed Feb. 4, 2005.
Final Office Action Mailed Sep. 20, 2007 in Co-pending U.S. Appl. No. 11/051,862, filed Feb. 4, 2005.
Final Office Action Mailed Dec. 8, 2008 in Co-pending U.S. Appl. No. 11/051,794, filed Feb. 4, 2005.
Final Office Action Mailed Dec. 31, 2007 in Co-pending U.S. Appl. No. 11/051,794, filed Feb. 4, 2005.
Non-Final Office Action Mailed Apr. 14, 2009 in Co-pending U.S. App. No. 11/051,862, filed Feb. 4, 2005.
Non-Final Office Action Mailed Apr. 16, 2008 in Co-pending U.S. Appl. No. 11/051,862, filed Feb. 4, 2005.
Non-Final Office Action Mailed Mar. 22, 2007 in Co-pending U.S. Appl. No. 11/051,862, filed Feb. 4, 2005.
Non-Final Office Action Mailed May 11, 2009 in Co-pending U.S. Appl. No. 11/051,794, filed Feb. 4, 2005.
Non-Final Office Action Mailed May 7, 2008 in Co-pending U.S. Appl. No. 11/051,794, filed Feb. 4, 2005.
Non-Final Office Action Mailed Mar. 23, 2007 in Co-pending U.S. Appl. No. 11/051,794, filed Feb. 4, 2005.
"Alacritus Announces Disk-Based Successor to Tape", Knapp Comm., Aug. 21, 2002.
"Alacritus Creates 'Next Critical Step' in Disaster Recovery for Patrick Air Force Base, Securitus VTL Sets the Pace", Apr. 20, 2004.
"Alacritus to Demo Chronospan Continuous Data Protection with the Cisco MDS 9000", Apr. 1, 2004.
"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.
"Alacritus, Hitachi CP and Nissho Team to Create Virtual Tape Library" internetnews.com, Jun. 25, 2001.
"Alacritus and Network Appliance Deliver Advanced Virtual Tape Library, Solution Shortens Backup Windows, Accelerates Data Recovery, and Simplifies Backup Management", Dec. 7, 2004.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Jun. 25, 2001.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.

"Alacritus Software Announces Virtual Tape Library Support for Legato Networker Data Protection Solution", Alacritus Software, Inc., Jan. 8, 2002.

"Alacritus Software's Chronospan: Make Time for Continuous Data Protection", Aberdeen Group, Inc., Oct. 2003.

"Alacritus Software FAQs" Alacritus Software, Inc. Jul. 2001.

"Alacritus Software's Securitus: Defining the Way to Virtual Tape Libraries", Aberdeen Group, Inc. Jul. 2003.

"Alacritus Software's Securitus I: Pointing the Way to Virtual Tape Libraries" Aberdeen Group, Inc. Mar. 2002.

Baltazar, Henry "More Intelligence is on the Way" eWEEK, Sep. 15, 2003.

Baltazar, Henry "Weaving Apps into SAN Fabric" eWEEK, Mar. 24, 2003.

Barrett, Alex, "The Case for Network Smarts", Storage Magazine, Jun. 2003.

Biggar, Heidi, "Alacritus Enables Disk-Based Backup", InfoStor, Sep. 2001.

Biggar, Heidi, "Disk and Tape Forge New Partnerships in backup Arena" InfoStor, Nov. 2001.

Camphusein, Alicia, "Hitachi Inks OEM Deal with Legato", Knapp Comm., Jul. 2002.

"Case Study Shizuoka-ken Noukyou Denson Center K.K., Reducing Management Costs Through Tapeless Backup At an iDC", Apr. 7, 2004.

"Chronospan" Alacritus Website, Oct. 2003.

"Cisco and Storage ISVs to Demo Protocol-Based Interface between Storage Appliances and the Cisco MDS 9000", Mar. 30, 2004.

"Continuous Data Protection: Business Continuity for the Era of Networked Storage: An Executive White Paper", Aberdeen Group, Inc., Jul. 2003.

"Customer Success" Alacritus Website, Oct. 2003.

"Disk-Based Data Protection" Alacritus Software Inc., Jul. 2001.

"Disk-Based Data Protection" Alacritua Software, Inc., Sep. 2001.

"Disk-Based Data Protection" AlacrituS Software, Inc., Sep. 2002.

Simon L. Garfinkel et al., "Rememberance of Data Passed: A Study of Disk Sanitization Practices", IEEE Security and Privacy, vol. 1, No. 1, 2003 19 pages.

Hill, David "Alacritus Software's Securitus: Defining the Way to Virtual Taped Libraries" Aberdeen Group, Inc. Jul. 2003.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.

Hatfield. "Write Read Verify Feature Set". May 14, 2004.

Komeiga, Kevin, "Vendor Pushes Disk Backup Over Tape" SearchStorage.com, Jan. 10, 2003.

Chris Lueth, "WORM Storage on Magnetic Disks Using SnapLock Compliance™ and SnapLock Enterprise™", Network Applicance, Inc., Sep. 2003, sections 1-5 13 pages.

"Manageability: Securitus v. Tape", Alacritus Website, Oct. 2003.

Microsoft Windows XP, released 2001.

"No Changes Required: Securitus v. Tape" Alacritus Website, Oct. 2003.

Novell NetWare Server Disks and Storage Devices Administration Guide. Netware 5.1, Jan. 2000, pp. 1-60.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ "Alacritus Software Announces New Customers for Securitus VTLA", Alacritus Software, Inc. Jan. 13, 2004.

Preston, W. Curtis, "Surprise! Cheap Disks Cure Slow Backup", Storage Magazine, Jun. 1, 2002.

"Product Brief: Rhapsody/Alacritus-Securitus/Xpath Virtual Tape in the Fabric", The Enterprise Storage Group, Aug. 2002.

Advisory Action Mailed Mar. 12, 2009 in Co-pending U.S. Appl. No. 11/051,794, filed Feb. 4, 2005.

Notice of Allowance Mailed Oct. 4, 2010 in Co-Pending U.S. Appl. No. 11/051,794, filed Feb. 4, 2006.

Centered Systems, "Second Copy 7", (1991-2007).

"Alcaritus to Demonstrate Chronospan CDP with the Brocade Fabric Application Platform at Storage Networking World", Apr. 1, 2004.

Non-Final Office Action Mailed Nov. 25, 2009 in Co-pending U.S. Appl. No. 11/051,794, filed Feb. 4, 2006.

Notice of Allowance Mailed Nov. 1, 2010 in Co-Pending U.S. Appl. No. 11/061,794, filed Feb. 4, 2006.

Non-Final Office Action Mailed Nov. 3, 2010 in Co-Pending U.S. Appl. No. 12/040,276, filed Feb. 29, 2008.

Notice of Allowance Mailed Apr. 4, 2011 in Co-Pending U.S. Appl. No. 12/040,276, filed Feb. 29, 2008.

* cited by examiner

METHOD AND APPARATUS FOR MAINTAINING COMPLIANT STORAGE

RELATED APPLICATIONS

A patent application for "Method and Apparatus for Mirroring Non-Compliant Storage to Compliant Storage", filed on Sep. 1, 2004, having the application Ser. No. 10/932,683, is hereby incorporated by reference in its entirety.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention generally relates to data storage, and specifically to maintaining compliant data storage of unstructured data.

BACKGROUND

There are a number of regulations that require a variety of data records be available for retrieval, for a specified period of time, from non-modifiable, non-erasable archives. For example, Securities and Exchange Commission (SEC) Rule 17a-4 (i.e., 17 C.F.R. §240.17a-4) requires that certain stock exchange members, brokers, and dealers maintain certain records for a period of time (typically three or seven years). Rule 17a-4 (hereinafter "the Rule," which may also encompass any other data permanence regulation) encompasses computerized records, such as e-mail and application documents (such as documents produced by Microsoft® Word® or Excel®). This data must therefore be archived for the period of time specified by the Rule in order to comply with the Rule.

Compliant storage is used to store the data required by the Rule. "Compliant" storage refers to data storage that complies with the Rule. "Non-compliant" storage refers to data storage that does not comply with the Rule. Compliance generally requires that the data must be archived and cannot be deleted or modified until the end of the period for which it must be retained. The data must also be retrievable in a reasonable period of time.

There are generally two types of computer records—those that are static and those that are frequently modified. E-mail is an example of static computer records. An e-mail sender composes and distributes an e-mail to one or more e-mail recipients. The recipients can either retain or delete the original e-mail. The recipients cannot modify the original e-mail. One or more recipients may reply to the e-mail, but the reply constitutes a discrete new record. Microsoft® Word® or Excel® documents are examples of frequently modified data. A user may work on the same document over a period of time. That user may choose to rewrite entire sections of the document. Over the course of its existence, a user may create hundreds or thousands of unique versions of that file that can be printed, viewed, or analyzed. The primary difference between static and modifiable documents is the notion of publication. An email recipient has received a published record. It has been distributed in a completed form. A Microsoft® Word® document, however, does not undergo such a publication event. Therefore, since a large percentage of computer data can easily be modified, several different versions of each document may need to be archived in order to comply with the Rule. Compliant storage therefore generates a copy of each document at a predetermined "reasonable" interval, for example, once a day. Compliant storage also requires that every copy must be non-deletable before the expiration of the period for which the copy must be maintained. Typical compliant storage includes optical and magnetic (tape) media.

FIG. 1 illustrates compliant storage of e-mail data. A system 100 includes an exchange server 102, an application 104, and compliant storage 106. The exchange server 102 includes a database 108 containing e-mail data. The application 104 extracts the e-mail data from the database 108 and stores the data on the compliant storage 106. The application may be software produced by Legato Systems, KVS, etc. The compliant storage 106 typically includes optical or tape media, and is stored for the period of time required by the Rule.

Databases are considered structured data, and e-mail data is considered semi-structured. Databases and other structured data can easily be stored using the application 104, and the compliant storage 106. The system 100 searches for new e-mail messages, and archives them. Since the e-mail database is semi-structured, and the e-mail data can easily be organized by the date of creation, the application 104 can easily determine the changes made since the last archive was created. Unstructured data, such as application files including word processing or spreadsheet files, cannot be archived using the system 100, because the application is unable to determine what changes have been made to the documents. As a result, unstructured data is typically archived in a compliant manner by performing full system backups to the compliant storage 106 on a regular basis.

Performing and maintaining frequent full system backups for several years, is both resource intensive and expensive. A storage server that requires archival may include tens of terabytes (TB) of data. If compliant backups are performed daily, then more than one thousand multi-TB backups would have to be maintained concurrently to comply with the Rule. The backups consume thousands of pieces of discrete media to be tracked, maintained, and kept available for retrieval.

Furthermore, during an investigation, the SEC may also require the stock exchange member, broker, or dealer under investigation to produce the records made on a specific date. System administrators managing the backups must search through the compliant media to locate the requisite data. The scale of search makes it difficult to fulfill the requirement that the data must be obtained within a short period of time to comply with the investigation.

What is needed is a method and apparatus for easily storing and retrieving archival documents to comply with the Rule.

SUMMARY OF THE INVENTION

The present invention includes methods and apparatuses for maintaining compliant storage. In one method, a request to delete a point-in-time image is received. A data structure including a retention date for the point-in-time image is then referenced. The point-in-time image is deleted if a current date is later than the retention date.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for maintaining compliant storage. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a storage server is mirrored onto a mirroring server. The mirroring server maintains point-in-time images of data stored on the storage server. The point-in-time images have a retention period. During the retention period, the point-in-time images must be maintained to comply with 17 C.F.R. 240.17a-4 (the "Rule"). It should be appreciated that other rules such as 17 C.F.R. 240.17a-3 or other regulations may be used with embodiments of the invention. When a command to delete a point-in-time image is issued, the file system of the mirroring server references a table including a list of point-in-time images and their retention dates. If the current date is greater than the retention date, the point-in-time image is deleted. If the current date is less than the retention date, the point-in-time image cannot be deleted.

Figure 1:
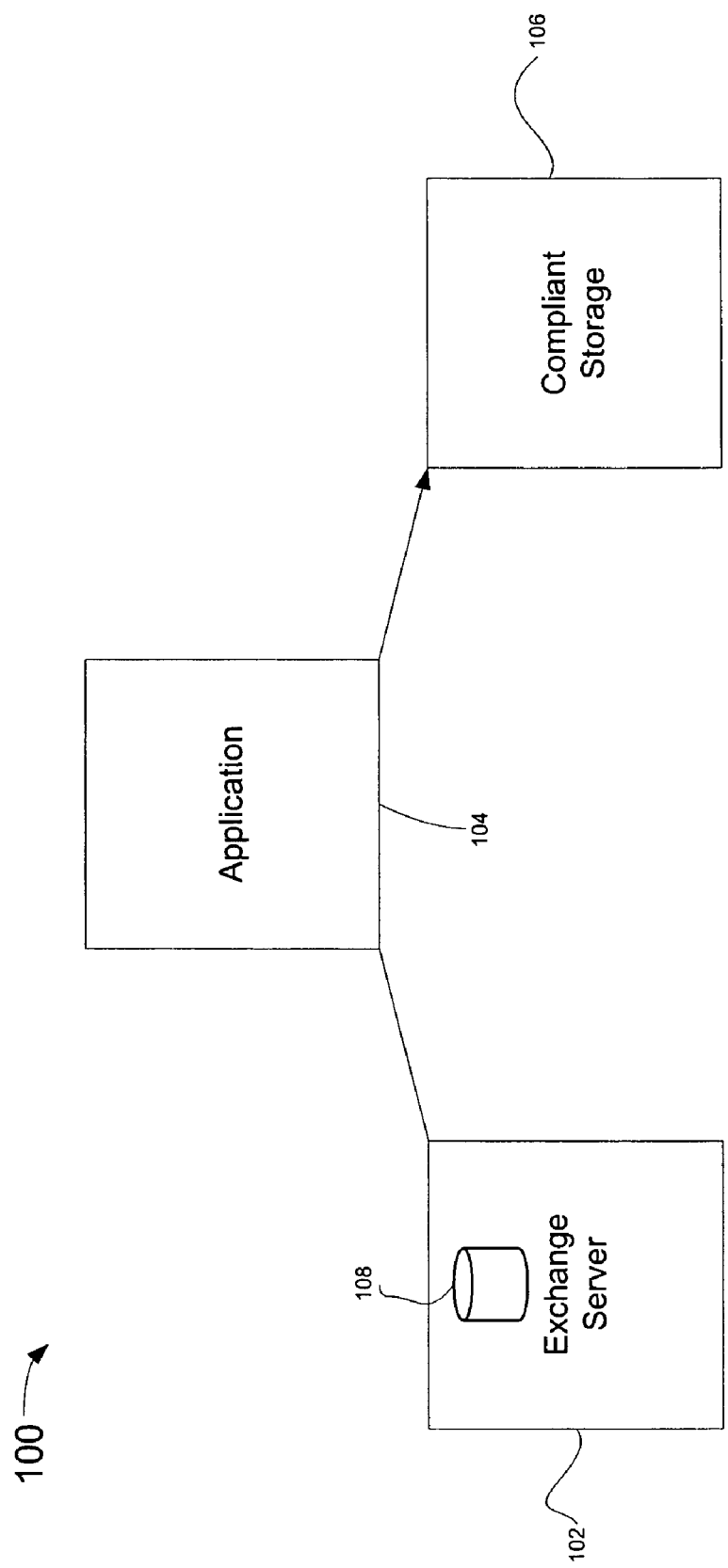
FIG. 1 illustrates compliant storage of e-mail data.
Figure 2:
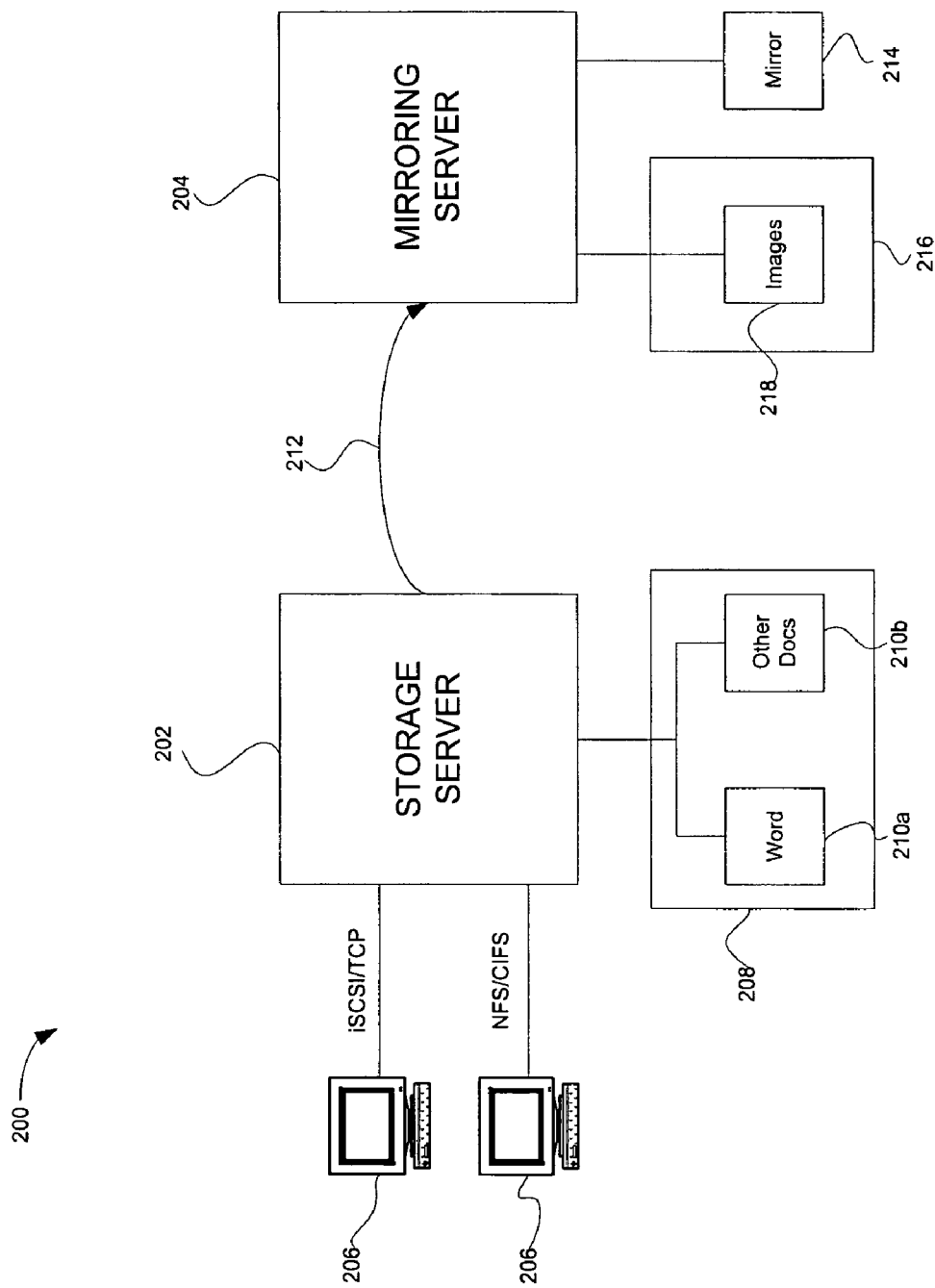
FIG. 2 illustrates an example of a configuration to facilitate data backup using mirroring.

FIG. 2 illustrates an example of a configuration to facilitate data backup using mirroring. The system 200 includes a storage server 202, and a mirroring server 204. The storage server 202 stores data, which is mirrored on the mirroring server 204. Mirroring describes an arrangement between a source and a destination. In this case, the storage server 202 is the source, and the mirroring server 204 is the destination. In the mirroring relationship, the mirroring server 204 maintains a copy of a volume stored by the storage server 202. A volume is a logical collection of data that may include one or more physical data storage devices, such as magnetic or optical storage.

Mirroring may be synchronous or asynchronous. In a synchronous mirroring relationship, every change that is made to the volume maintained by the source is written to the mirrored volume on the destination before the source considers the data to be written. Using an asynchronous relationship, the destination periodically updates the mirror using changes made to the source since the last update. Embodiments of this invention are described using asynchronous mirroring. However, it is understood that synchronous mirroring may also be used.

Several clients 206 are connected to the storage server 202. The storage server 202 and mirroring server 204 are connected through a network connection 212. The clients 206 are individual workstations that store data on the storage server 202. The storage server 202 may be a file server, or filer, such as those manufactured by Network Appliance, Inc., located in Sunnyvale, Calif. (NetApp®). The storage server 202 maintains centralized data storage for the several clients 206. The clients 206 may use several different interfaces, such as the Small Computer System Interface, (iSCSI), Transmission Control Protocol (TCP), Network File System (NFS), and Common Internet File System (CMS) to communicate with the storage server 202. The storage server 202 may maintain one or more volumes 208 that include data such as Microsoft Word® documents 210a and other documents 210b that may include unstructured data stored by the storage server 202. According to one embodiment, the volumes 208 and the documents 210a and 210b do not comply with the Rule or other regulation. The documents 210a and 210b can generally be modified or deleted, since the storage server 202 is used as storage for the clients 206.

The mirroring server 204 may be maintained at a different physical location than the storage server 202. The network 212 may be a local area network (LAN), or a wide area network (WAN) such as the Internet. If the mirroring server 204 is maintained at a separate location physically remote to the storage server 202 certain conditions that affect the storage server 202 (such as power outages) may not affect the mirroring server 204.

The mirroring server 204 may also be a file server such as a filer. According to one embodiment of the invention, the mirroring server 204 includes less expensive physical storage than the storage used for the storage server 202 to reduce the cost of the mirroring server 204 and increase the amount of storage available. The mirroring server 204 maintains a mirror 214 of the volume 208 maintained by the storage server 202. The mirroring server 204 also maintains a volume 216 of point-in-time images 218. The point-in-time images 218, as will be explained below, are images of the mirrored volume 214 that can be used to recreate the state of the mirrored system at a specific point-in-time. For example, a point-in-time image 218 may be able to recreate every file in the mirrored volume 214 as it was on Apr. 15, 2004. According to an embodiment of the invention, the point-in-time images 218 comply with the Rule or other regulation. According to this embodiment, the system 200 generates compliant point-in-time images 218.

Figure 3:
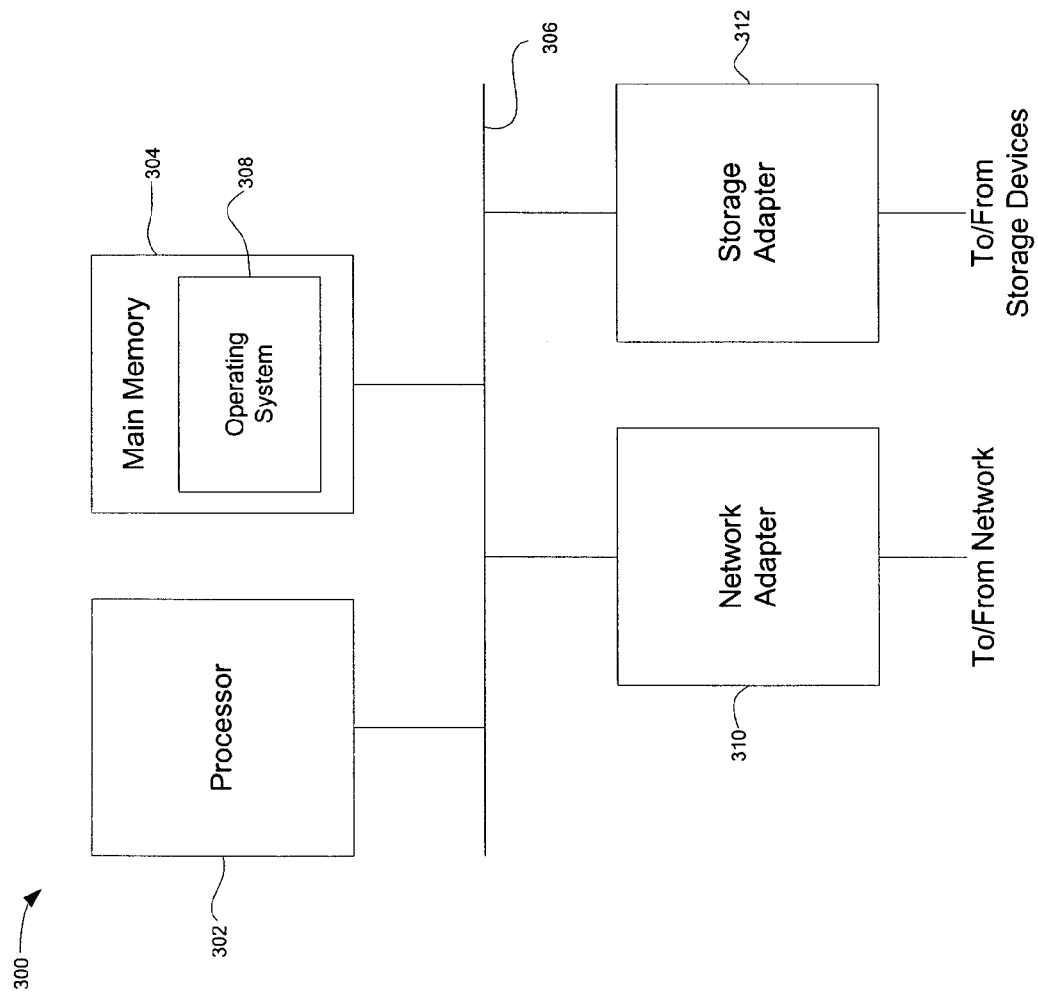
FIG. 3 shows the architecture of a filer, representative of the storage server or the mirroring server, according to certain embodiments of the invention.

FIG. 3 shows the architecture of a filer 300, representative of the storage server 202 or the mirroring server 204, according to certain embodiments of the invention. A filer is a type of storage server used to store file data. Note that certain standard and well-known components which are not germane to the present invention are not shown. The filer 300 includes a processor 302 and main memory 304, coupled together by a bus system 306. The bus system 306 in FIG. 3 is an abstraction that represents any one or more separate physical buses and/or point-to-point connections, connected by appropriate bridges, adapters and/or controllers. The bus system 306, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 302 is the central processing unit (CPU) of the filer 300 and, thus, controls the overall operation of the filer 300. In certain embodiments, the processor 302 accomplishes this by executing software stored in main memory 304. The processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 304, which is generally some form of random access memory (RAM), stores at least a portion of the operating system 308 of the filer 300. Techniques of the present invention may be implemented within the operating system 308, as described further below. The operating system 308 may be, for example, the ONTAP operating system by NetApp®. Also connected to the processor 302 through the bus system 306 are a network adapter 310 and a storage adapter 312. The network adapter 310 provides the filer 300 with the ability to communicate with remote devices, such as clients and/or another filer, over a network and may be, for example, an Ethernet adapter. The storage adapter 312 allows the filer to access the external mass storage devices and may be, for example, a Fibre Channel (FC) adapter or SCSI adapter.

Figure 4:
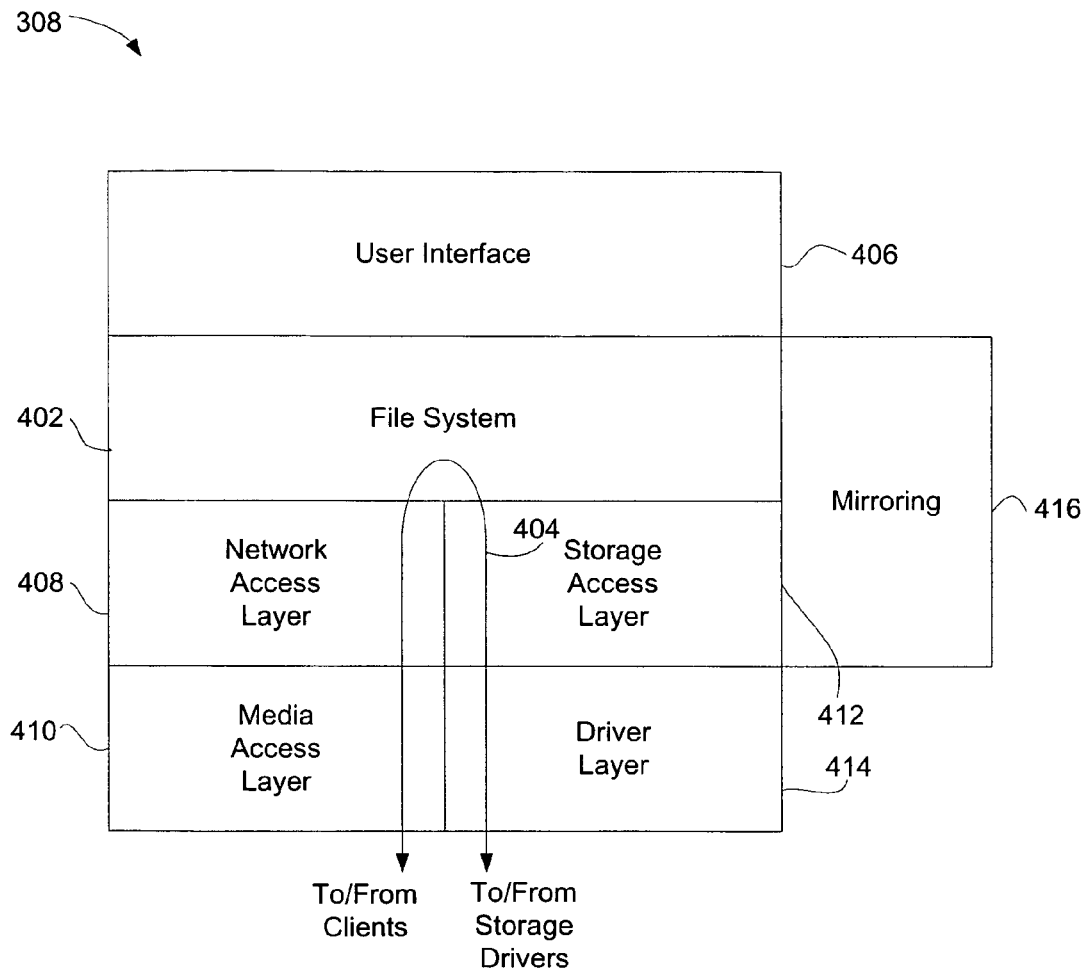
FIG. 4 illustrates the operating system of the filer, according to certain embodiments of the invention.

FIG. 4 illustrates the operating system 308 of the filer 300, according to certain embodiments of the invention. As can be seen, the operating system 308 includes a number of layers. The core of the operating system 308 is the file system 402. The file system 402 is a programmatic entity that imposes structure on an address space of one or more physical or virtual storage devices, such as disks, so that the operating system 308 may conveniently read and write data containers, such as files and blocks, and related metadata. The file system 402, among other responsibilities, executes read and write operations on the mass storage devices in response to client requests, maintains directories, and manages consistency point operations. An example of the file system 402 suitable for this purpose is the Write Anywhere File Layout to (WAFL) file system from Network Appliance, such as used in the NetApp® Filers. The file system 402 in certain embodiments operates on blocks of data of a predetermined exemplary size, such as 4 Kbytes. Also shown in FIG. 4 is the logical data path 404 from clients to mass storage devices, through the file system 402.

The operating system 308 also includes a user interface 406, through which a network administrator or other user can control and/or configure the filer 300 of FIG. 3 (e.g., remotely from a management station). The user interface 406 may generate a command line interface and/or a graphical user interface for this purpose.

The client side of the operating system 308 includes a network access layer 408 and, at the lowest level, a media access layer 410. The network access layer 408 implements any of various protocols used to communicate with client devices, such as network file system (NFS), common Internet file system (CIFS) and/or hypertext transport protocol (HTTP). The media access layer 410 includes one or more drivers which implement the protocols used to communicate over the network, such as Ethernet.

On the storage device side, the operating system 308 includes a storage access layer 412 and, at the lowest level, a driver layer 414. The storage access layer 412 implements a disk storage protocol such as RAID, while the driver layer 414 implements a lower-level storage device access protocol, such as Fibre Channel or SCSI.

The operating system of 308 also includes a mirroring module 416, which is operatively coupled to the file system 402 and the storage access layer 412. The mirroring module 416 controls the synchronization of data at the remote secondary site with data stored at the primary site. The techniques introduced herein may be implemented at least partially using the mirroring module 416.

Figure 5:
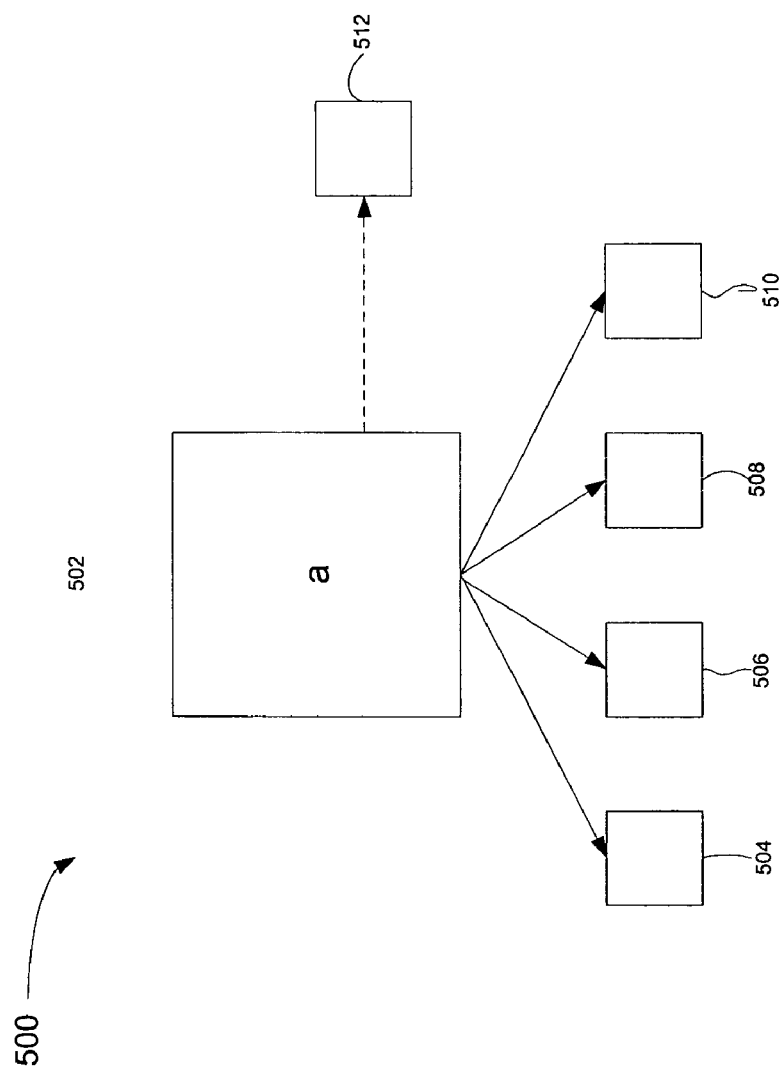
FIG. 5 illustrates a technique for creating point-in-time images according to an embodiment of the invention.

FIG. 5 illustrates a technique for creating point-in-time images 218 according to an embodiment of the invention. The point-in-time image 218 (see FIG. 2) is a data structure stored by the mirroring server. The point-in-time image 218 is a data structure that recreates a file structure of a volume including pointers that point to blocks including the data stored by that file structure. The point-in-time 218 image may be recalled at a later time to recreate the state of a volume managed by the storage server 202 of FIG. 2 at the time the point-in-time image was created. When the volume 214 of FIG. 2 is recreated, the pointers stored by the point-in-time image 218 point to blocks created by a baseline image or by previous point-in-time images. For example, if one wanted to know the contents of a file on a certain date, they could recall the point-in-time image 218 for that date.

FIG. 5 illustrates a file 500 being stored by the point-in-time image. Files and other data are typically stored in the form of one or more blocks. A block is a logical unit of data storage on a storage device. A file may include pointers referencing one or more blocks that store the data comprising the file. The point-in-time image 218 (see FIG. 2) typically includes pointers to new blocks that have changed since the last point-in-time image 218. For example, if only one file had been modified since the last point-in-time image 218, the current point-in-time image 218 would include the new blocks of the file, and the pointers to the new blocks, as well as pointers to the old blocks that had not changed. When the new blocks are copied onto the mirroring server 204 of FIG. 2, the original blocks are not modified. In this way, both the new version of the file, and the file as it originally was, can be recreated.

When the first point-in-time image 218 (see FIG. 2) in the volume 216 of FIG. 2 is created, all of the blocks corresponding to the files that are to be archived are copied into the volume 216. This set of blocks is known as the baseline. The original point-in-time image points to these data blocks. When blocks are subsequently modified, the new point-in-time images will point to copies of the original blocks, which cannot be deleted in order to maintain compliance.

The point-in-time image includes pointers to recreate the several files stored by the storage server 202 of FIG. 2. The file 500 includes several pointers 502 to data stored in four blocks 504, 506, 508, and 510. Each reference to the file 500 in a point-in-time image includes the pointers to the blocks 504-510. For example, if, on April 15, the file 500 includes the data in the blocks 504-510, the point-in-time image created on April 15 will include pointers to the blocks 504-510 representing the file 500. If, after the April 15 point-in-time image is created, the block 510 is modified, when the April 16 point-in-time image is created, a copy 512 of the block 510 is created. In the April 16 point-in-time image, the pointers 502 point to the block 512 rather than the block 510. In this way, the mirroring server 204 of FIG. 2 avoids copying redundant information.

When a point-in-time image is made, the blocks to which the point-in-time image refers are "locked." When the blocks are locked, according to embodiments of the invention, they cannot be deleted until the retention period has expired. Further, they also cannot be modified. When a block is modified on the storage server 202 of FIG. 2, the mirroring server 204 of FIG. 2 creates a copy of the block, to which the new version of the file in the new point-in-time image points. As soon as the copied block 512 is created, it is also locked, and cannot be modified.

The point-in-time images 218 are made according to a specified scheduling criterion. For example, the criterion may be a predetermined or regular interval, such as once daily. The criterion may be determined so as to comply with the Rule. For example, the criterion may be chosen so that the point-in-time images 218 are created at a "reasonable" interval.

Figures 6A, 6B:
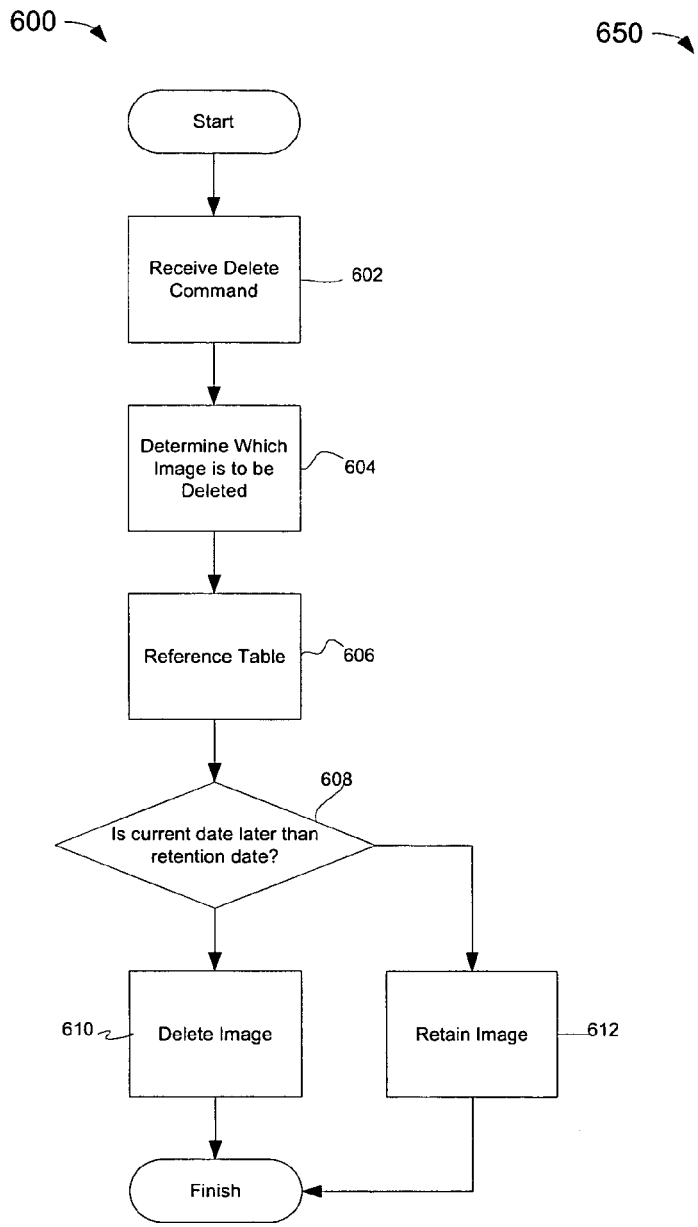
FIG. 6A is a flowchart describing a process for modifying a delete command in the file system.
FIG. 6B illustrates a table that is referenced by the file system when a delete command is issued.

FIGS. 6A and 6B illustrate a technique for implementing a retention date for point-in-time images. FIG. 6A is a flowchart describing a process for modifying a delete command in the file system 402 (see FIG. 4). FIG. 6B illustrates a table 650 that is referenced by the file system 402 when a delete command is issued. The techniques described herein are used when a system command to delete a point-in-time image is issued. In order to comply with the Rule, the point-in-time images must be retained for the stated retention period (typically three or seven years).

The process 600 describes the actions taken by the file system 402 (see FIG. 4) when a delete command is issued. In block 602, a delete command to delete a point-in-time image is received by the file system 402. The delete command may have been issued by an automated process, a user, an application, etc. The delete command is directed toward one or more point-in-time images 218 (see FIG. 2) in the volume 216 (see FIG. 2) of point-in-time images 218.

In block 604, the process 600 determines which point-in-time image 218 (see FIG. 2) is to be deleted. The point-in-time images 218 may be organized using any of several naming conventions. For example, a point-in-time image 218 made on Apr. 15, 2004, may be given the identifier "Apr.15.2004." This identifier corresponds to an image number. Each point-in-time image 218, as it is created, is also assigned an image number, whose order may not be consistent with the identifier issued above. For example, the Apr.15.2004 image may have the image number 14. The Apr.16.2004 image may have an image number 21. The file system 402 (see FIG. 4) reconciles the identifiers and the image numbers.

In block 606, the process 600 calls the table 650, as shown in FIG. 6B. The table 650 includes a column 652 including image numbers and a column 654 including retention dates for those image numbers. The retention date corresponds to a retention period for the image. For example, if an image is created on Apr. 15, 2004, and the retention period is three years, then the retention date would be Apr. 15, 2007, as shown in the second column 654.

In block 608, it is determined whether the current date is greater than the retention date. If it is later than the retention date found in the column 654, then, in block 610, the point-in-time image is deleted. If the current date is prior to the retention date, then in block 612, the point-in-time image 218 (see FIG. 2) may not be deleted.

The process 600 can be used to ensure that the point-in-time images 218 (see FIG. 2) stored in the volume 216 are compliant with the Rule. The file system 402 (see FIG. 4) incorporates the process 600 into the delete command, requiring that the table 650 be referenced before a delete command can be executed. This ensures that a point-in-time image cannot be deleted before the end of the retention period.

Figure 7:
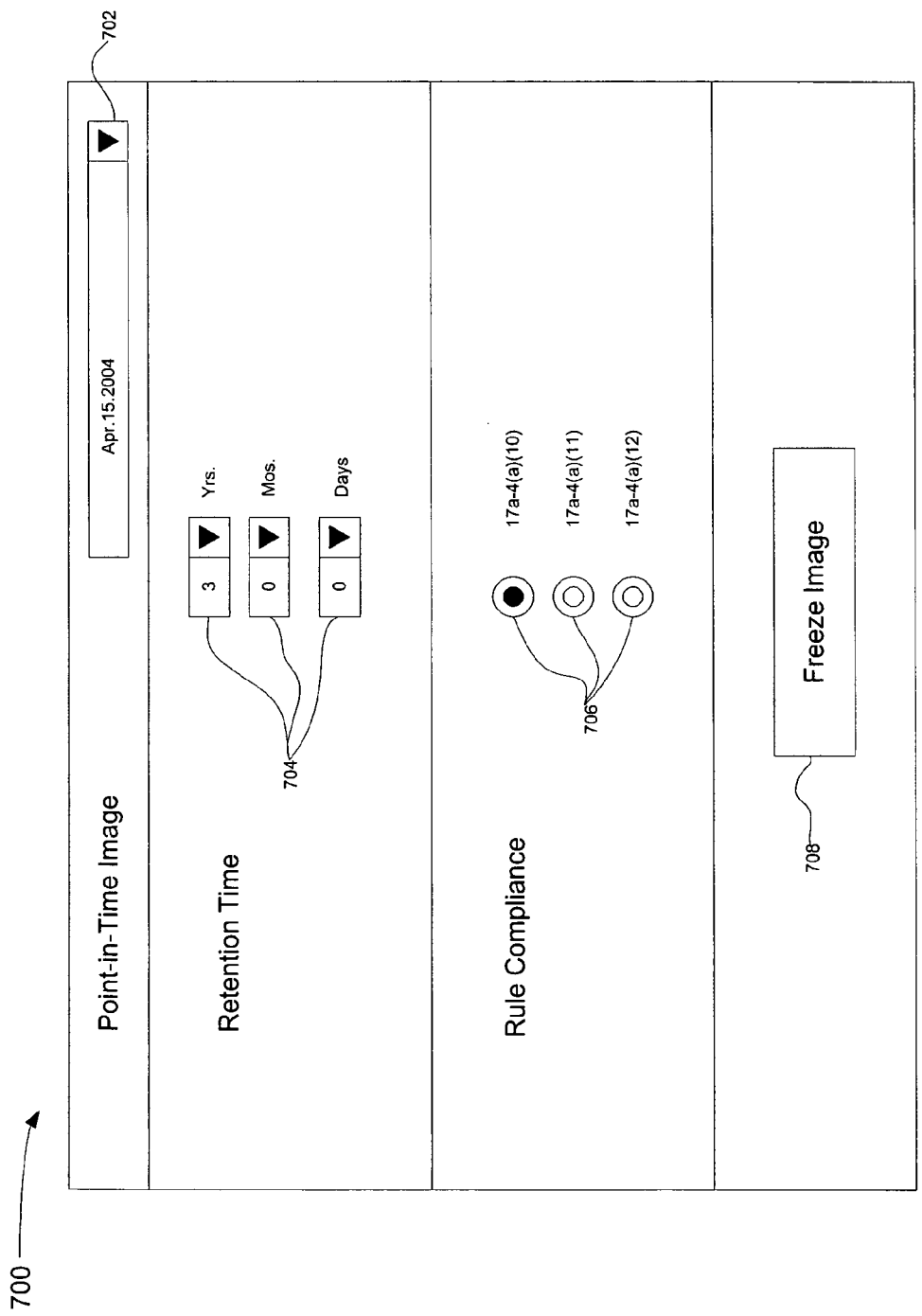
FIG. 7 illustrates a control panel for setting retention times according to one embodiment of the invention.

FIG. 7 illustrates a control panel 700 for setting retention times according to one embodiment of the invention. The control panel may be issued for an individual image, according to the image's identifier. A pull-down menu 702 or other selection device can be used to choose different point-in-time images 218 (see FIG. 2).

According to one embodiment of the invention, the retention period may be chosen using several pull-down menus 704. According to the embodiment, in order to maintain compliance with the Rule, the control panel 700 may disallow any retention time less than would be necessary for compliance. For example, if a system administrator chose a two-year retention time where three were necessary, the control panel 700 could prevent the system administrator from selecting that retention time and issue an error message.

The control panel 700 may also include several radio buttons 706 that can be used to select times according to the type of data. For example, a point-in-time image may point to data subject to Rule 17a-4(a)(10). If the system administrator were to choose the radio button corresponding to that rule, the control panel 700 would automatically choose the correct retention period. The system administrator could then lengthen the retention period if necessary.

The control panel 700 may also include a button 708 that can freeze the point-in-image 218 (see FIG. 2), preventing it from being deleted. A system administrator may choose to freeze a particular point-in-time image 218 if it is of interest. For example, if the SEC or other government agency is investigating the actions that occurred on the day the image was written, the image may be "frozen" to prevent it from being deleted, even after the original retention period.

It is understood that the control panel 700 may be have several configurations other than the one shown. For example, the control panel 700 may be implemented using a text-based parser or through a physical interface. The control panel 700 may also include other commands or choices.

The techniques introduced above have been described in the context of a network attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. A method for complying with a data preservation regulation, the method comprising:
    mirroring data of a non-compliant storage server by using a mirroring server to generate mirrored data;
    generating a point-in-time image of the mirrored data according to a specified scheduling criterion;
    assigning a retention period to the point-in-time image;
    receiving a command to delete the point-in-time image; and
    preventing deletion of the point-in-time image in response to the command to delete, when the retention period has not expired.

2. The method of claim 1, wherein generating the point-in-time image comprises:
   determining changes in blocks on the mirroring server; and
   generating the point-in-time image including the changes.

3. The method of claim 1, wherein the regulation comprises Securities and Exchange Commission (SEC) Rule 17a-4.

4. The method of claim 1, further comprising:
   choosing a three year retention period.

5. The method of claim 1, wherein the point-in-time image is read-only.

6. The method of claim 5, further comprising preventing modification of the point-in-time image until the retention period expires.

7. The method of claim 1, wherein said mirroring is asynchronous mirroring.

8. The method of claim 1, wherein the mirrored data is dynamically updated at the mirroring server in response to client initiated updates to the data of the non-compliant storage server.

9. A system to provide compliance with a data preservation regulation, the system comprising:
   a first storage server to maintain data, the first storage server being non-compliant with the data preservation regulation; and
   a mirroring storage server coupled to the first storage server, to provide compliance with the data preservation regulation by mirroring the data to generate mirrored data, generating a point-in-time image of the mirrored data according to a specified scheduling criterion, assigning a retention period to the point-in-time image, and responding to a command to delete the point-in-time image by preventing deletion of the point-in-time image when the retention period has not expired.

10. The method of claim 9, wherein generating the point-in-time image comprises:
    determining changes in blocks on the mirroring server; and
    generating the point-in-time image including the changes.

11. The method of claim 9, wherein the data preservation regulation comprises Securities and Exchange Commission (SEC) Rule 17a-4.

12. The method of claim 9, wherein the point-in-time image is read-only.

13. The method of claim 12, further comprising preventing modification of the point-in-time image until the retention period expires.

14. The method of claim 9, wherein the mirroring server uses asynchronous mirroring to mirror the data.

15. The system of claim 9, wherein the mirrored data is dynamically updated at the mirroring server in response to client initiated updates to the data maintained by the first storage server.

16. A method for complying with a data preservation regulation, the method comprising:
    mirroring data of a non-compliant storage server by using a mirroring server to generate mirrored data;
    generating a read-only point-in-time image of the mirrored data according to a specified scheduling criterion;
    assigning a retention period to the read-only point-in-time image;
    receiving a command to delete the read-only point-in-time image; and
    preventing deletion of the read-only point-in-time image in response to the command to delete, when the retention period has not expired.

\* \* \* \* \*